United States Patent
Vennelakanti et al.

(10) Patent No.: US 10,202,826 B2
(45) Date of Patent: Feb. 12, 2019

(54) AUTOMATIC METHOD OF GENERATING DECISION CUBES FROM CROSS DEPENDENT DATA SETS

(71) Applicant: HITACHI, LTD., Chiyoda-ku, Tokyo (JP)

(72) Inventors: Ravigopal Vennelakanti, San Jose, CA (US); Anshuman Sahu, San Jose, CA (US); Umeshwar Dayal, Saratoga, CA (US)

(73) Assignee: HITACHI, LTD., Tokyo (JP)

( * ) Notice: Subject to any disclaimer, the term of this patent is extended or adjusted under 35 U.S.C. 154(b) by 72 days.

(21) Appl. No.: 15/126,947

(22) PCT Filed: Mar. 30, 2015

(86) PCT No.: PCT/US2015/023399
§ 371 (c)(1),
(2) Date: Sep. 16, 2016

(87) PCT Pub. No.: WO2015/153492
PCT Pub. Date: Oct. 8, 2015

(65) Prior Publication Data
US 2017/0089180 A1  Mar. 30, 2017

(30) Foreign Application Priority Data

Mar. 31, 2014  (WO) ................ PCT/US2014/032394

(51) Int. Cl.
*E21B 41/00* (2006.01)
*G06Q 50/06* (2012.01)

(52) U.S. Cl.
CPC ............. *E21B 41/00* (2013.01); *G06Q 50/06* (2013.01)

(58) Field of Classification Search
CPC ................................ G06Q 50/06; E21B 41/00
See application file for complete search history.

(56) References Cited

U.S. PATENT DOCUMENTS

| | | | |
|---|---|---|---|
| 5,784,335 A | 7/1998 | Deplante et al. | |
| 6,002,985 A | 12/1999 | Stephenson | |
| 6,012,016 A | 1/2000 | Bilden et al. | |

(Continued)

FOREIGN PATENT DOCUMENTS

| WO | 2007075488 A2 | 7/2007 |
|---|---|---|
| WO | 2007116008 A1 | 10/2007 |

(Continued)

OTHER PUBLICATIONS

Vennelakanti et al., Expansion of Service Business through Collaborative Creation with Customers, Mar. 2016, Hitachi Review, vol. 65, No. 2, pp. 1-82.*

(Continued)

*Primary Examiner* — Mischita L Henson
(74) *Attorney, Agent, or Firm* — Procopio, Cory, Hargreaves & Savitch LLP

(57) ABSTRACT

Systems and methods are directed to oil and gas management. In example implementations, data relating to oil and gas management is aggregated and placed in a cube along several cube dimensions, which can include scalar, temporal and spatial dimensions. The dimensions can be structured as a hierarchy, such that output can be generated as a roll up or roll down along the hierarchy.

15 Claims, 19 Drawing Sheets

FIG. 1(a)

(56) References Cited

U.S. PATENT DOCUMENTS

| | | | |
|---|---|---|---|
| 6,131,673 | A | 10/2000 | Goldman et al. |
| 6,282,452 | B1 | 8/2001 | DeGuzman |
| 6,430,547 | B1 | 8/2002 | Busche et al. |
| 6,519,568 | B1 | 2/2003 | Harvey et al. |
| 6,549,879 | B1 | 4/2003 | Cullick et al. |
| 6,907,375 | B2 | 6/2005 | Guggari et al. |
| 7,142,986 | B2 | 11/2006 | Moran |
| 7,577,527 | B2 | 8/2009 | Vega Velasquez |
| 7,894,991 | B2 | 2/2011 | Del Castillo et al. |
| 7,945,488 | B2 | 5/2011 | Karr et al. |
| 8,010,589 | B2 | 8/2011 | Peng et al. |
| 8,103,463 | B2 | 1/2012 | Kalgren et al. |
| 8,145,462 | B2 | 3/2012 | Foucault |
| 8,145,677 | B2 | 3/2012 | Al-Shameri |
| 8,332,153 | B2 | 12/2012 | Aamodt et al. |
| 8,380,475 | B2 | 2/2013 | Slupphaug et al. |
| 8,504,570 | B2 | 8/2013 | Hawkins et al. |
| 8,532,968 | B2 | 9/2013 | Oury et al. |
| 2002/0174130 | A1 | 11/2002 | Wagner |
| 2004/0210547 | A1 | 10/2004 | Wentland et al. |
| 2005/0149307 | A1 | 7/2005 | Gurpinar et al. |
| 2006/0047431 | A1* | 3/2006 | Geiser .................. G01V 1/306 702/12 |
| 2006/0239118 | A1 | 10/2006 | Guidry et al. |
| 2007/0185655 | A1 | 8/2007 | Le Bemadjiel |
| 2008/0294606 | A1 | 11/2008 | Moran et al. |
| 2009/0132458 | A1 | 5/2009 | Edwards et al. |
| 2009/0225630 | A1 | 9/2009 | Zheng et al. |
| 2010/0147510 | A1 | 6/2010 | Kwok et al. |
| 2011/0071963 | A1 | 3/2011 | Piovesan et al. |
| 2011/0098931 | A1 | 4/2011 | Kosmala et al. |
| 2011/0130914 | A1 | 6/2011 | Shah et al. |
| 2011/0174541 | A1 | 7/2011 | Strachan et al. |
| 2013/0035920 | A1 | 2/2013 | Al-Shammari |
| 2013/0161097 | A1 | 6/2013 | Benson et al. |
| 2014/0166274 | A1 | 6/2014 | Weiner et al. |

FOREIGN PATENT DOCUMENTS

| | | |
|---|---|---|
| WO | 2013052735 A1 | 4/2013 |
| WO | 2013188241 A2 | 12/2013 |
| WO | 2014146004 A2 | 9/2014 |
| WO | 2014150706 A1 | 9/2014 |

OTHER PUBLICATIONS

Tang et al., "A Simple Approach for Data Mining in Delphi", Dec. 2007, Data Science Journal, vol. 6, Supplement, pp. S981-S985.*

International Search Report and Written Opinion for PCT App No. PCT/US2015/023399 dated Jul. 14, 2015, 8 pgs.

International Search Report and Written Opinion for PCT App No. PCT/US2014/032394 dated Aug. 22, 2014.

Sautot, L. et al., The Hierarchical Agglomerative Clustering with Gower Index: A Methodology for Automatic Design of OLAP Cube in Ecological Data Processing Context, Ecological Informatics, 2014, 14 pgs.

* cited by examiner

| Process Info Map | Attribute name | Category | Type (measured/ derived) | Description |
|---|---|---|---|---|
| Well-Index | APINo | Scalar | Measured | Unique identifier |
| Well Production | OilProd | Scalar | Measured | |
| Well Trajectory | <Latitude, Longitude> | Spatial | Measured | |
| Drilling Subsystem | Torque | Temporal | Measured | |
| Completions | Proppant | Scalar | Measured | |

FIG. 8

| Attribute name | Attribute dimension | Scalar Index | Temporal Index | Spatial Index |
|---|---|---|---|---|
| TORQUE | Temporal | 1 | 1 | 1 |
| PRODUCTION | Scalar | 2 | 1 | 1 |
| ROTARYRPM | Temporal | 1 | 2 | 1 |

FIG. 9

| Sub-system Name | Independent Variables | Dependent Variables |
|---|---|---|
| Circulation System | Pump Strokes/Minute | Pump Pressure |
| | Total SPM | Flow |
| | Total Strokes | Lag Volume |
| | Mud circulation velocity | PUMP1SPM_spm |
| | Mud return volume | PUMP2SPM_spm |
| | | PUMP3SPM_spm |
| | | TOTALSPM_spm |
| | | Mud volume_In |
| Drilling System | Rotary RPM | Weight on Bit |
| | Block Height | Rate of Penetration |
| | Inclination | Mechanical Specific Energy |
| | Toolface | BITDEPTH_ft |
| | HOOKLOAD | TVDATBIT_ft |
| | ROTARYRPM | HOLEDEPTH_ft |
| | DRILLMODE | ROP_ft/hr |
| | MWDDEPTH | WOB_klbs |
| | BLOCKHEIGHT | TORQUE_ftlbs |
| | | STICKSLIP_rpm |
| | | POWERDRIVESHOCKRISK |
| | | SHOCKRISK |
| | | POWERDRIVESTICKSLIP_rpm |
| Well Test/Log System | Resistivity Deep Depth | Gamma corrected |
| | Resistivity Shallow Depth | Resistivity Shallow |
| | Gamma Depth | Total Gas |
| | Gas Totalizer Depth | Temperature |

FIG. 10

| WELL ID | DATA ATTRIBUTE | DEPTH | 3D TRAJECTORY DATA | LATITUDE/ LONGITUDE |
|---|---|---|---|---|
| W1 | Well Trajectory | 10386 FT | W1DATASET | LAT1/LONG1 |
| W2 | Well Trajectory | 11286 FT | W2DATASET | LAT2/LONG2 |

FIG. 16

AUTOMATIC METHOD OF GENERATING DECISION CUBES FROM CROSS DEPENDENT DATA SETS

CROSS-REFERENCE TO RELATED APPLICATIONS

This application is a U.S. National Stage entry of PCT Application No. PCT/US2015/023399, filed on Mar. 30, 2015, which claims priority under 35 USC 119(a) to U.S. application Ser. No. 14/473,394, filed Aug. 29, 2014, and which claims priority to PCT Application No. PCT/US2014/032394, filed Mar. 31, 2014. The contents of the foregoing are incorporated by reference.

BACKGROUND

Field

The present disclosure relates generally to oil and gas data analytics, and more specifically, to generating decision cubes from cross dependent data sets in oil and gas data sets.

Related Art

In the related art, oil and gas rigs utilize computerized systems to assist the operators of the rigs throughout the different phases of the oil or gas rigs (e.g., exploration, drilling, production, completions, etc.). Such computer systems are deployed for the development of energy sources such as shale gas, oil sands, and deep water resources. In the related art, attention has shifted to the development of shale gas for supplying future energy needs. Related art advances in horizontal directional drilling and hydraulic fracturing technologies have unlocked the potential for recovering natural gas from shale to become a viable energy source.

However, the issue of maximizing output from an oil and gas reservoir, particularly shale gas reservoirs, is not well understood, even with the assistance from present computer systems. The process of making production decisions and sizing top-side facilities is mostly a manual process that depends on the judgment of the rig operator. Furthermore, operators often struggle with real time performance of support for down-hole gauges, semi-submersible pumps, and other equipment. Non-Productive Time (NPT) for a rig may constitute over 30% of the cost of drilling operations.

One aspect of the issue of output maximization is the lack of effective data processing and data analytics, along with the sheer volume of data received from oil and gas wellsites. The data sets obtained from different upstream processes can be substantial in terms of number of available attributes. Manually developing applications that utilize these attributes can be very time-consuming.

SUMMARY

In example implementations of the present disclosure, the attributes are classified into scalar, spatial, and temporal categories. Additional categories, such as spatio-temporal, scalar-spatial, scalar-temporal, scalar-spatio-temporal, and so on may be added depending on the desired implementation. Each of the categories forms the dimensions of the decision cube resulting in a multi-dimensional cube. In example implementations, the hierarchy and grain can be defined along each dimension. Further, in example implementations, the measures in the cube correspond to the observed attributes of the datasets. Derived measures can also be added into the cube by defining classes of functions that can operate on particular categories.

Aspects of the present disclosure may include a method, which involves identifying one or more processes related to oil and gas management from managed rig systems; mapping at least one of stream and database data to one or more processes related to oil and gas management; identifying one or more attributes for the one or processes related to the oil and gas management; incorporating the one or more attributes into a cube having dimensions having at least a scalar dimension, a spatial dimension, and a temporal dimension; applying class functions on the at least the scalar dimension, the spatial dimension, and the temporal dimension of the cube; and generating key performance indicators related to the oil and gas management from the applying of the one or more class functions on the at least the scalar dimension, the spatial dimension, and the temporal dimension of the cube.

Aspects of the present disclosure may include a computer program, which involves instructions for executing a process. The instructions can include identifying one or more processes related to oil and gas management from rig systems managed by the computer program; mapping at least one of stream and database data to one or more processes related to oil and gas management; identifying one or more attributes for the one or processes related to the oil and gas management; incorporating the one or more attributes into a cube having dimensions having at least a scalar dimension, a spatial dimension, and a temporal dimension; applying class functions on the at least the scalar dimension, the spatial dimension, and the temporal dimension of the cube; and generating key performance indicators related to the oil and gas management from the applying of the one or more class functions on the at least the scalar dimension, the spatial dimension, and the temporal dimension of the cube. The instructions for the computer program may be stored on a non-transitory computer readable medium and can be executed by one or more processors.

Aspects of the present disclosure further include a management server, which can involve a memory configured to manage cube management information to facilitate a cube and one or more processes related to oil and gas management from rig systems managed by the management server, and, a processor, configured to map at least one of stream and database data to one or more processes related to oil and gas management; identify one or more attributes for the one or processes related to the oil and gas management; incorporate the one or more attributes into the cube comprising dimensions of at least a scalar dimension, a spatial dimension, and a temporal dimension; apply class functions on the at least the scalar dimension, the spatial dimension, and the temporal dimension of the cube; and generate key performance indicators related to the oil and gas management from the application of the one or more class functions on the at least the scalar dimension, the spatial dimension, and the temporal dimension of the cube.

BRIEF DESCRIPTION OF THE DRAWINGS

FIG. 8 illustrates example management information for classification of received attributes, in accordance with an example implementation.

FIG. 9 illustrates example management information of the cube, in accordance with an example implementation.

FIG. 10 illustrates the management of independent and dependent attributes across subsystems, in accordance with an example implementation.

FIG. 16 illustrates example data information retrieved by the decision cube for generating key performance indicators, in accordance with an example implementation.

DETAILED DESCRIPTION

Figure 1A:
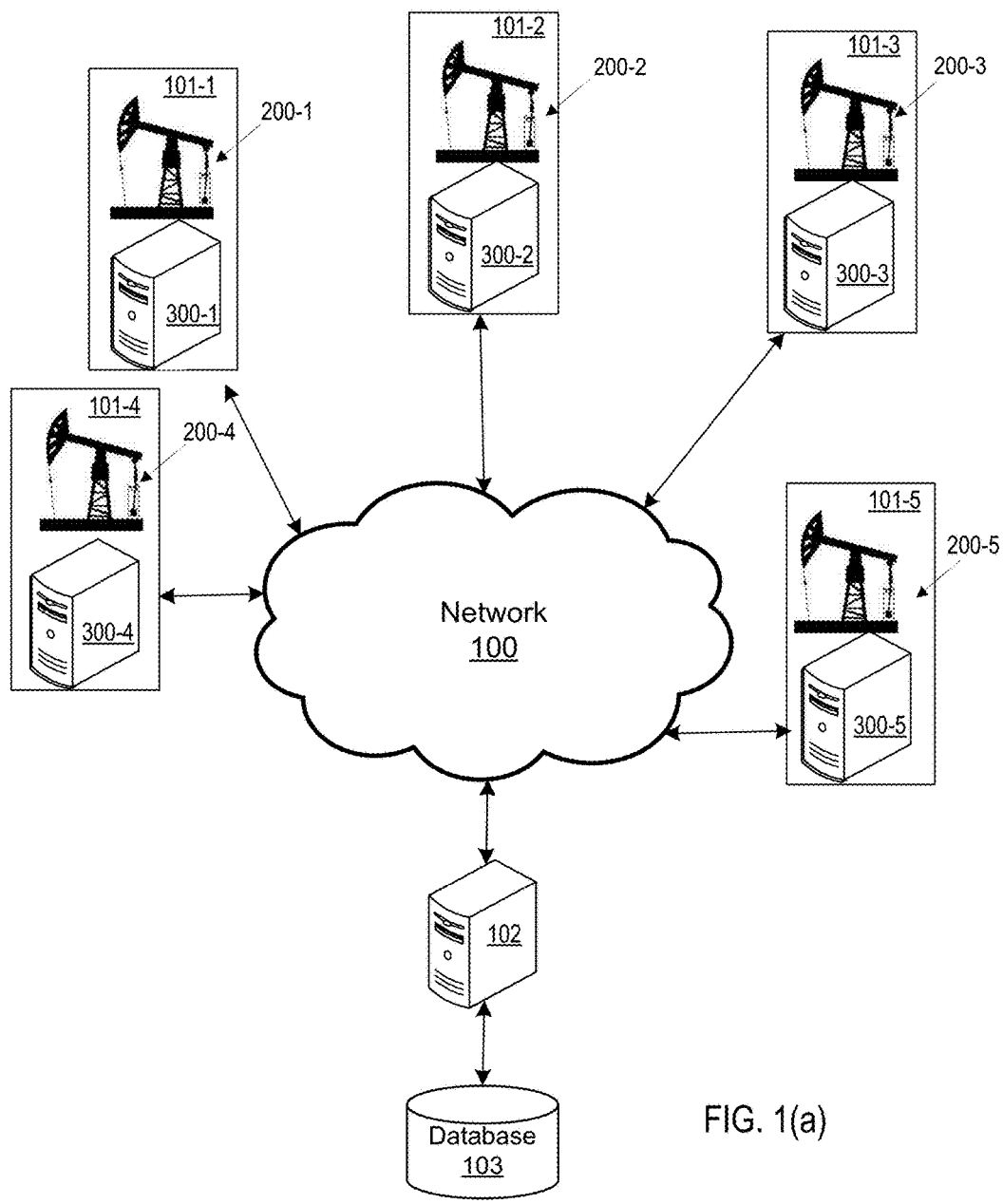
FIG. 1(a) illustrates a system involving a plurality of rig systems and a management server, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The term "rig" and "well" may also be used interchangeably. "Rig systems" and "wellsites" may also be utilized interchangeably.

Example implementations of the present disclosure include systems and methods that analyze the commonalities among attributes available across different processes, and then leverage that analysis to automatically generate applications from a decision cube by applying pre-defined classes of functions on these attributes. Oil and gas data are analyzed from exploration, drilling, completions, and production processes which collectively fall under the category of upstream operations. In order to automatically generate applications, example implementations propose systems and methods of constructing a decision cube.

Figure 2:
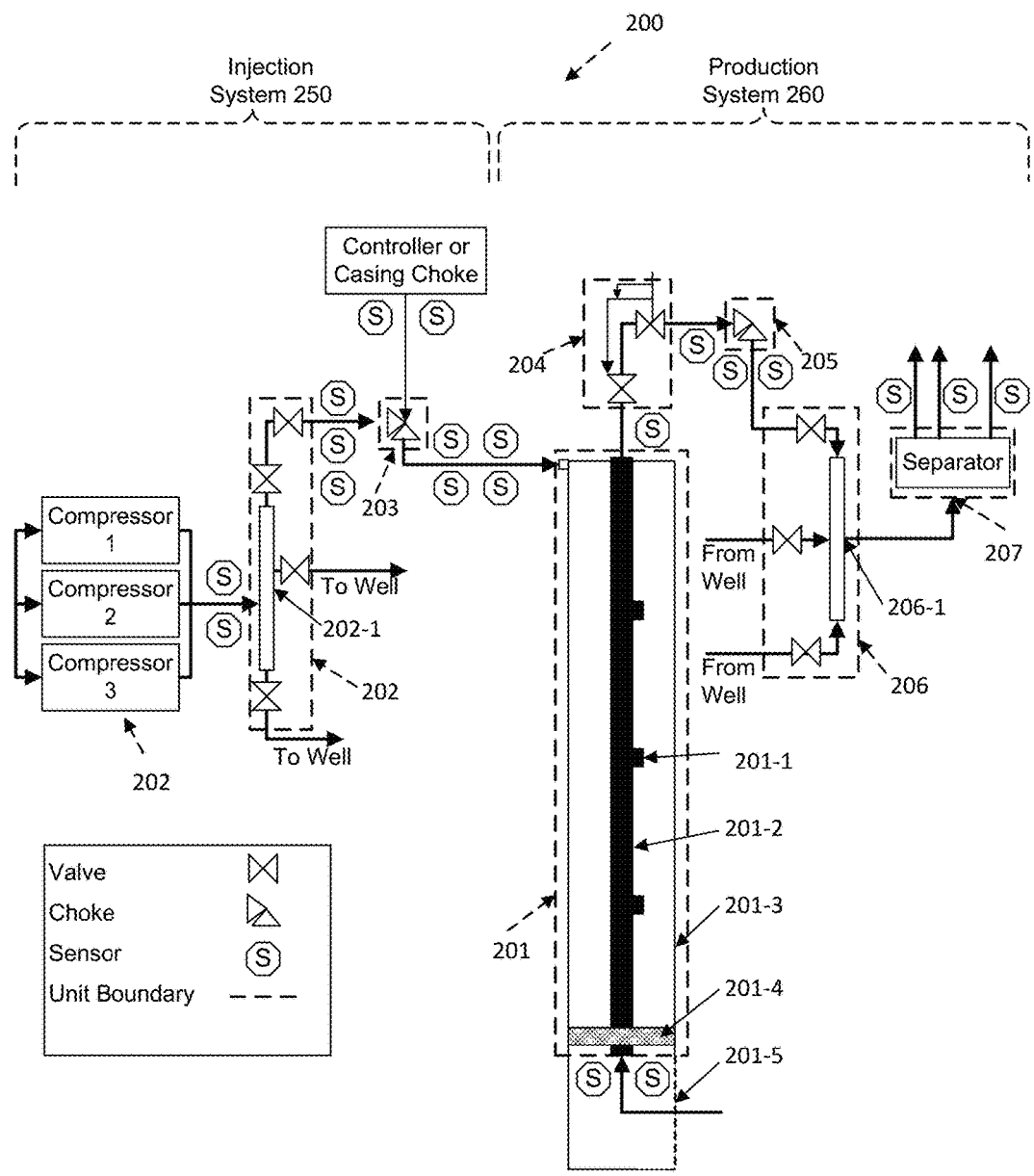
FIG. 2 illustrates a rig in accordance with an example implementation.
Figure 3:
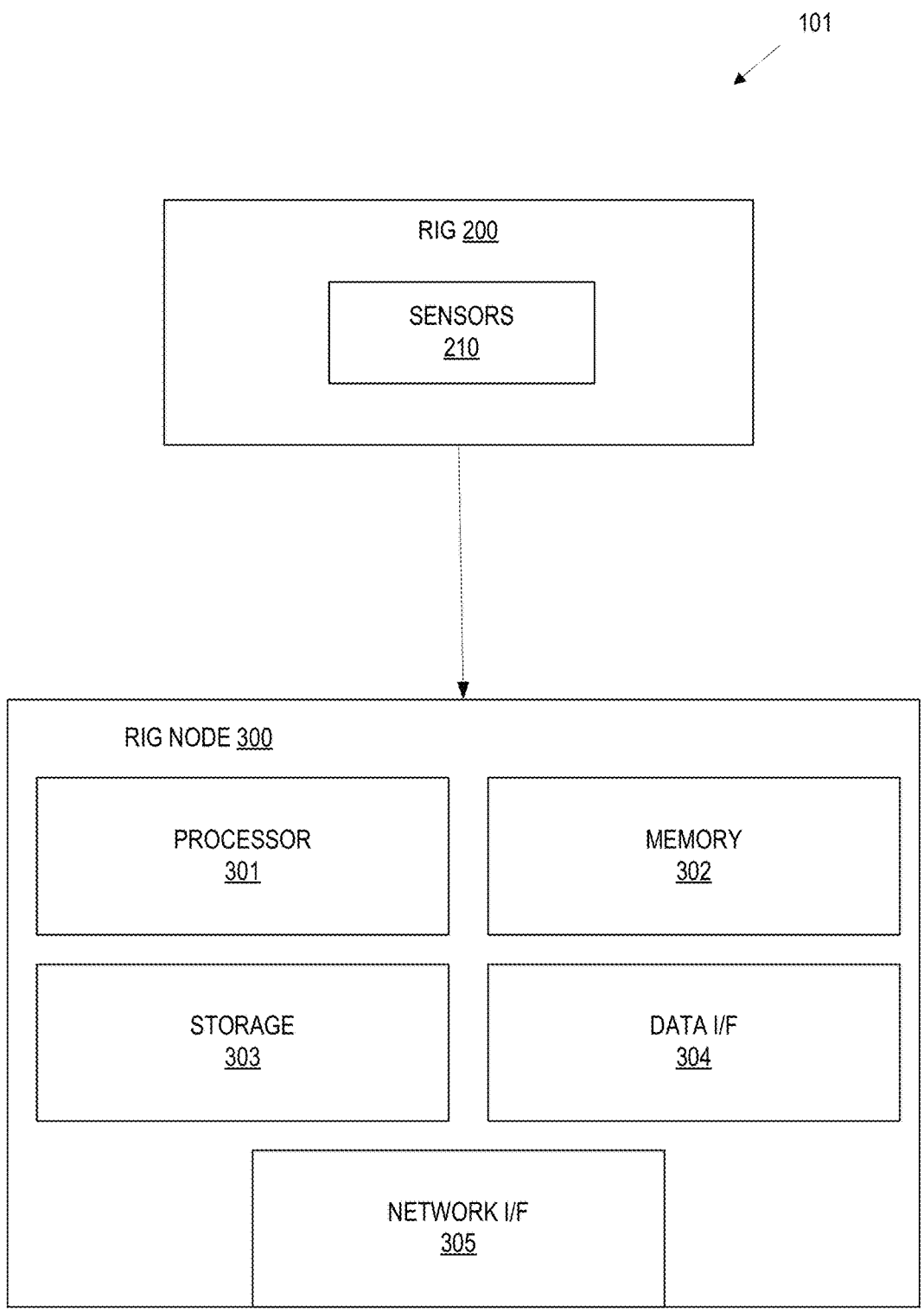
FIG. 3 illustrates an example configuration of a rig system, in accordance with an example implementation.

FIG. 1(a) illustrates a system involving a plurality of rig systems and a management server, in accordance with an example implementation. One or more rig systems 101-1, 101-2, 101-3, 101-4, and 101-5 can each involve a corresponding rig 200-1, 200-2, 200-3, 200-4, 200-5 as illustrated in FIG. 2 along with a corresponding rig node 300-1, 300-2, 300-3, 300-4, and 300-5 as illustrated in FIG. 3. Each of the rig systems 101-1, 101-2, 101-3, 101-4, and 101-5 is connected to a network 100 which is connected to a management server 102. The management server 102 manages a database 103, which contains data aggregated from the rig systems in the network 100. In alternate example implementations, the data from the rig systems 101-1, 101-2, 101-3, 101-4, and 101-5 can be aggregated to a central repository or central database such as public databases that aggregate data from rigs or rig systems, such as for government compliance purposes, and the management server 102 can access or retrieve the data from the central repository or central database.

Figure 1B:
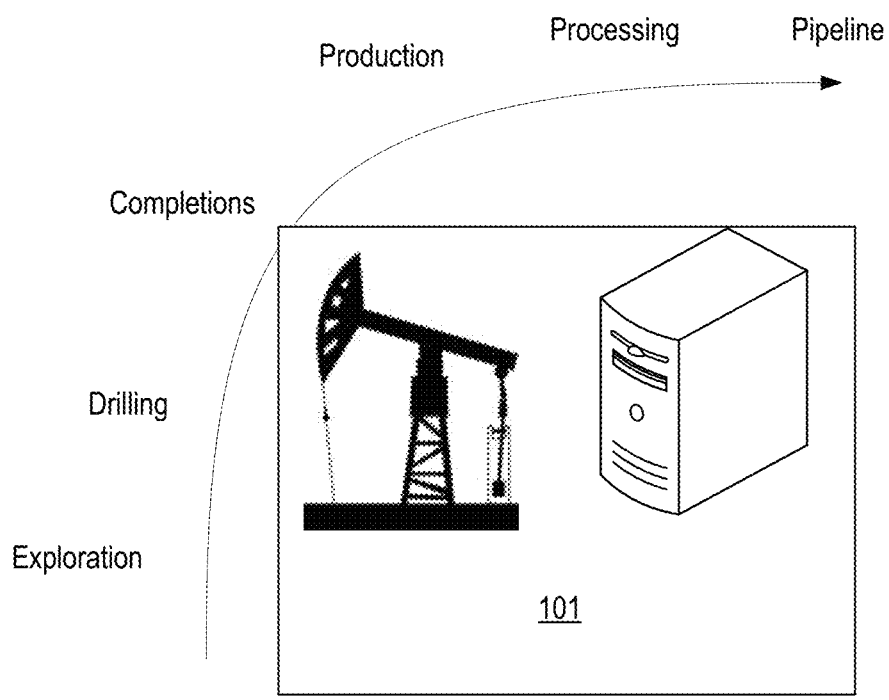
FIG. 1(b) illustrates an example timeline for a rig system, in accordance with an example implementation.

FIG. 1(b) illustrates an example timeline for a rig system, in accordance with an example implementation. The timeline for the rig system 101 may include multiple phases of rig operation. These phases can include (but are not limited to) an exploration phase, a drilling phase, a completions phase, a production phase, a processing phase and a pipeline phase. Example implementations may involve data or attributes associated with one or more of the phases of the timeline, depending on the desired implementation.

During the exploration phase, the well is initially drilled to determine whether reservoirs with oil or gas are present and the initial construction of the rig. In example implementations described herein, the rig node may be configured to assist the user in determining how to configure the rig and the parameters for the drilling during the exploration phase.

The drilling phase follows the exploration phase as determined in the exploration phase, e.g., if promising amounts of oil and gas are confirmed from the exploration phase. During the drilling phase, the size and characteristics of the discovery are determined and technical information is utilized to allow for more optimal methods for recovery of the oil and gas. An appraisal drilling can be performed and a rig is established. In example implementations described herein, the rig node may be configured to assist the user in determining appropriate parameters for the drilling and assist in the management and obtaining of desired characteristics for the rig.

The completions phase is directed to the determination as to whether the well should be completed as a well or whether it should be abandoned as a dry hole. The completion phase transforms the drilled well into a producing well. During this phase, the casing of the rig may be constructed, along with the perforations. Various aspects of the construction of the rig, such as cementing, gravel packing and production tree installation may be employed. Sensors may be employed to determine various parameters for facilitating the completion of the rig, such as rate of flow, flow pressure and gas to oil ratio measurements, but not limited thereto.

The production phase follows the completions phase and is directed to the facilitation of production of oil or gas. The production phase includes the operation of wells and compressor stations or pump stations, waste management, and maintenance and replacement of facility components. Sensors may be utilized to observe the above operations, as well as determining environmental impacts from parameters such as sludge waste accumulation, noise, and so on. Example implementations described herein may provide feedback to rig system operators to maximize the production of the rig based on the use of model signatures.

During the processing and pipelining phase, the produced oil or gas is processed and transferred to refineries through a pipeline.

FIG. 2 illustrates an example rig 200 in accordance with an example implementation. The example implementation depicted in FIG. 2 is directed to a shale gas rig, however, similar concepts can be employed at other types of rigs as well without departing from the inventive scope of the present disclosure. The well 201 may include one or more gas lift valves 201-1 which are configured to control hydrostatic pressure of the tubing 201-2. Tubing 201-2 is configured to extract gas from the well 201. The well 201 may include a case 201-3 which can involve a pipe constructed within the borehole of the well. One or more packers 201-4 can be employed to isolate sections of the well 201. Perforations 201-5 within the casing 201-3 allow for a connection between the shale gas reservoir to the tubing 201-2.

The rig 200 may include multiple sub-systems directed to injection of material into the well 201 and to production of material from the well 201. For the injection system 250 of the rig 200, there may be a compressor system 202 that includes one or more compressors that are configured to inject material into the well such as air or water. A gas header system 202 may involve a gas header 202-1 and a series of valves to control the injection flow of the compressor system 202. A choke system 203 may include a controller or casing choke valve which is configured to reduce the flow of material into the well 201.

For the production system 260 of the rig 200, there may be a wing and master valve system 204 which contains one or more wing valves configured to control the flow of production of the well 201. A flowline choke system 205 may include a flowline choke to control flowline pressure from the well 201. A production header system 206 may employ a production header 206-1 and one or more valves to control the flow from the well 201, and to send produced fluids from the well 201 to either testing or production vessels. A separator system 207 may include one or more separators configured to separate material such as sand or silt from the material extracted from the well 201.

As illustrated in FIG. 2 various sensors may be applied throughout the rig to measure various data or attributes for a rig node, which are described in further detail below. These sensors provide feedback to the rig node which can interact with the system as illustrated in FIGS. 1(a) and 1(b), and can be fed to the management server 102 for database storage 103, and/or supplied to a central repository or database such as a public database, which can then be harvested by management server 102.

FIG. 3 illustrates an example configuration of a rig system 101, in accordance with an example implementation. The rig system 101 includes a rig 200 as illustrated in FIG. 2 which contains a plurality of sensors 210. The rig system 101 includes a rig node 300 which may be in the form of a server or other computer device and can contain a processor 301, a memory 302, a storage 303, a data interface (I/F) 304 and a network I/F 305. The data I/F 304 interacts with the one or more sensors 210 of the rig 200 and store raw data in the storage 303, which can be sent to a management server for processing, or to a central repository or central database. The network I/F 305 provides an interface to connect to the network 100.

Figure 4:
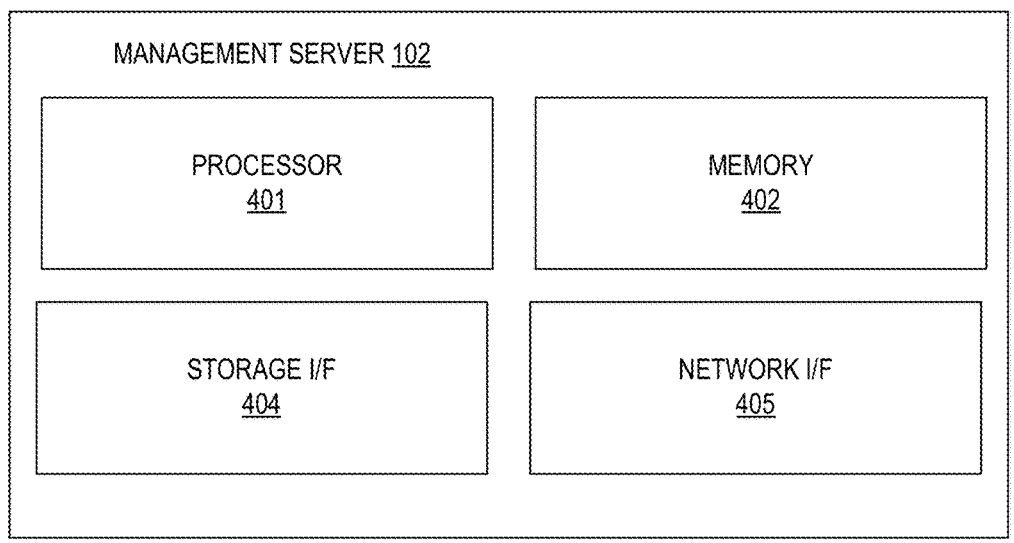
FIG. 4 illustrates a configuration of a management server 102, in accordance with an example implementation.

FIG. 4 illustrates a configuration of a management server 102, in accordance with an example implementation. Management server 102 may involve a processor 401, a memory 402, a storage I/F 404 and a network I/F 405. The processor 401 is configured to execute one or more programs in the memory 402, to process data and for cube construction. The storage I/F 404 is the interface to facilitate connections between the management server 102 and the database 103. The network I/F 405 facilitates interactions between the management server 102 and the plurality of rig systems. Data is aggregated to the management server by the network I/F and then subsequently stored in the database for future analytics. Alternatively, the plurality of rig systems may send the data to a central database or repository, which is then processed by the management server 102. Management server 102 may execute a process for constructing a decision cube by using programs stored in memory 402 and executed by processor 401, as illustrated in FIG. 5.

Figure 5:
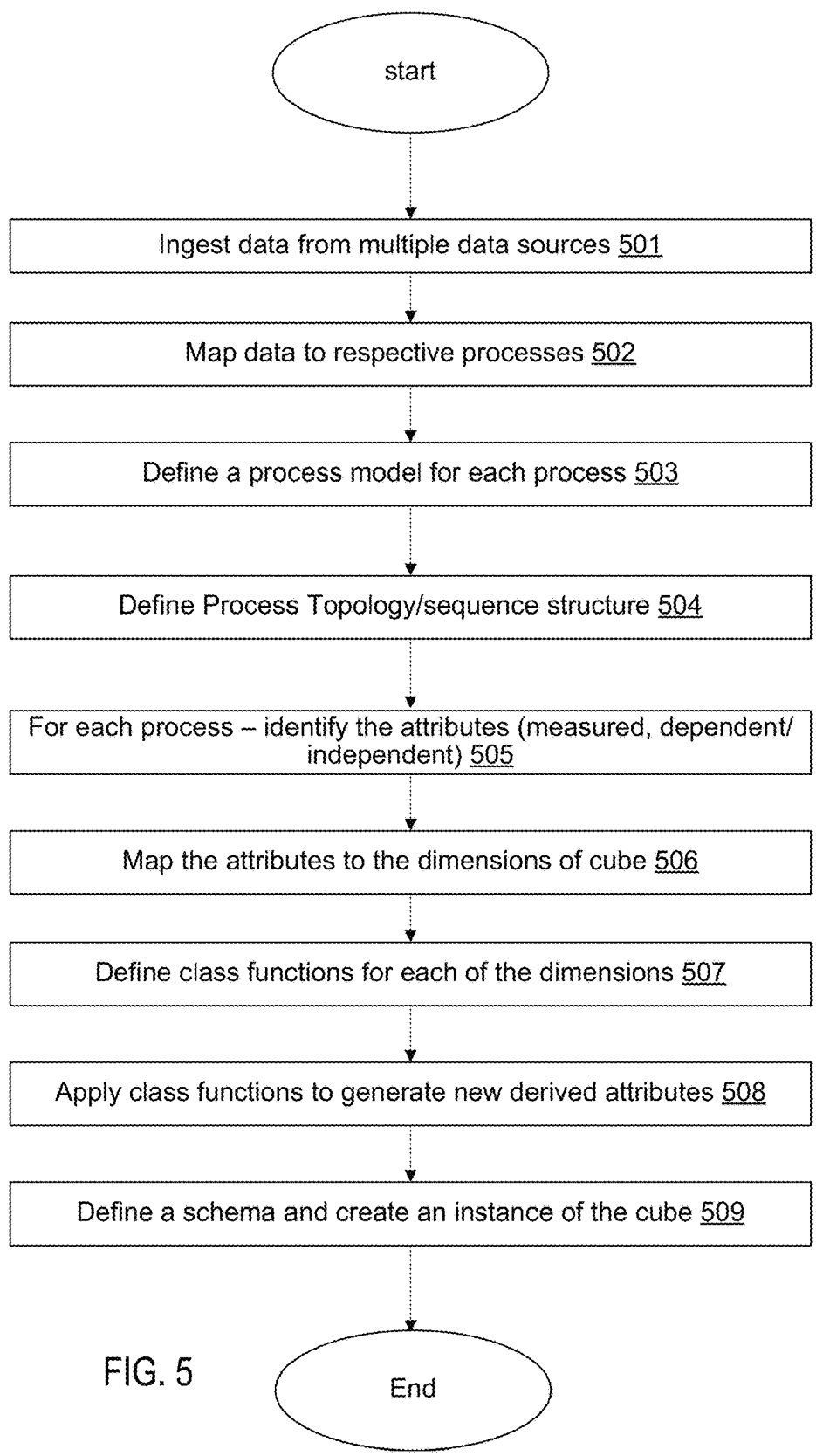
FIG. 5 illustrates a flow diagram for constructing a decision cube, in accordance with an example implementation.

FIG. 5 illustrates a flow diagram for constructing a decision cube, in accordance with an example implementation. At 501, the process begins and the management server 102 conducts an ingestion of data from multiple data sources, such as data streamed from rig systems or obtained from databases (e.g., central repository or central/public database) regarding the wellsites under management. Such data can contain information about attributes from different processes. The data can be multi-faceted-streaming or stored; structured or unstructured, and so on. At 502, the management server 102 maps the data to the respective processes, wherein the management server 102 determines which data attributes belong to which process. This can be implemented, for example, by identifying attributes from a table of oil and gas management attributes.

At 503, the management server 102 defines a process model for each process. In this process, the management server defines the flows of activities in each process. At 504, the management server 102 defines a process topology/sequence structure. Here, the management server 102 defines the sequence in which the processes (and/or different activities inside a process) occur.

At 505, the management server 102 identifies the attributes (measured, dependent/independent) for each process. Measured attributes are the attributes which are measured/recorded by the rig systems 101. The management server 102 is also configured to define dependent/independent attributes. For example, attributes are dependent if other attributes exhibit influence on them. When defining dependent/independent attributes, the management server 102 may determine to allow only the combinations of features from the current process activity or with any preceding process activity.

At 506, the management server 102 maps the attributes to the dimensions of cube. In example implementations, there are three primary dimensions of the cube, which include scalar, temporal and spatial. Other dimensions can also be added depending on the desired implementation, including and not limited to Spatio-Temporal, Scalar-Temporal, Scalar-Spatial, Scalar-Spatio-Temporal and so on. For example, an attributed indexed by space (e.g., <latitude, longitude, depth>) only is mapped along spatial dimension; an attribute indexed by time (e.g., day, month, year) only is mapped along temporal dimension; and an attribute that is indexed by well API (American Petroleum Institute) number may be mapped along the scalar dimension. In examples of other possible attributes, Spatio-Temporal attributes are indexed by both space and time; Scalar-Temporal attributes are indexed by both well API and time; Scalar-Spatial attributes are indexed by both well API and space; and Scalar-Spatio-Temporal attributes are indexed by well API, space and time. By use of the spatial, temporal and scalar dimensions, the management server can facilitate cube operations like roll-up, drill-down to be performed as described below.

The attributes are classified into at least the scalar, spatial, and temporal categories, which therefore define the decision cube that can automate the generation of different key performance indicators (KPIs) representative of the oil and gas management and operations across a well or many wells. Further, the hierarchy and grain can be defined along each dimension to facilitate cube operations.

The measures in the cube correspond to the observed attributes of the datasets. We can also add derived measures into the cube by defining classes of functions. Derived measures after application of functions can be thought as equivalent to KPIs which can be visualized through the dashboard.

At 507, the management server 102 defines class functions for each of the feature dimensions. These functions can correspond to key-performance indicators (KPIs) that are of interest to the application developers/end users, depending on the desired implementation. Class functions can be defined as the group of functions that can be applied on the attributes based on the dimension.

At 508, the management server 102 applies class functions on the respective attributes to generate additional derived attributes. At 509, for the combined set of measured and derived attributes, the management server 102 defines a schema and creates an instance of the cube. The management server creates the appropriate hierarchy and grain configurations based on the data and adapts the cube configurations based on new data types or attribute grain.

In the example implementations, the attributes may be processed in a hierarchical manner. Thus, when output is desired, the management server may be able to "roll up" or "roll down" through the hierarchy to display desired results. For example, for time-series attributes, an example roll up through the hierarchy can include: seconds→hours→days→weeks→quarter→year. The roll down can involve the traversal of the hierarchy in the other direction. In addition, some examples of temporal class functions that can be applied on time-series or temporal attributes to generate additional derived attributes can include: Seasonality; slope; range; central tendencies; landmark points; similarity; motifs; distance metric; correlation (auto, cross); smoothing/denoising; outlier; forecast/prediction; change point detection, and so on.

In an example implementation of a hierarchy for spatial attributes, the hierarchy can include: {depth, latitude, longitude}→section→range→Township→Field→county→state. Some examples of spatial class functions that can be applied on spatial attributes to generate additional derived attributes, include: Variogram; Moran's I, Geary's C (spatial correlation); nearest neighbor index; Ripley's k-function; Gettis-Ord local statistic, kernel density estimation; co-location of events (spatial distance between events across depth/distance); spatial similarity; spatial motifs and so on.

In an example implementation of a hierarchy for scalar attributes, the hierarchy can include the API as organized in accordance with a desired implementation. Some examples of scalar class functions that can be applied to generate additional derived attributes can include enumerate; and count.

In example implementations, several functions can be applied by the management server to create derived attributes. The derived attributes should be amenable to general operations on Online analytical processing (OLAP) cube like slice and dice, drill down, roll up, and pivot. For illustration, an example is provided below to demonstrate how roll up on change point method can be implemented on the oil production from a well, which is a temporal attribute.

Let $Y_i$ denote the oil production from a well indexed by time stamp i=1, 2, ... n. For each r, $1 \leq r < n$, record the following statistic:

$$T_r = \frac{\overline{Y}'_{n-r} - \overline{Y}_r}{[r^{-1} + (n-r)^{-1}]^{1/2}}$$

$$\overline{Y}_r = \frac{1}{r} \sum_{1}^{r} Y_i,$$

$$\overline{Y}'_{n-r} = \frac{1}{n-r} \sum_{r+1}^{n} Y_i.$$

Denote the change point function as cpd. The function evaluated on $Y_i$ is $cpd(Y_i)$ evaluated as:

$$\tau = \underset{r}{\text{argmax}} |Q_{nr}|$$

$$Q_{nr} = -T_r$$

Assume the set of wells in a region R (like field, county etc.) is denoted by S: $\{W_j: j \in R\}$. To roll up cpd from a well level to region level, evaluate cpd for each well $W_j$. The idea here is time index r is the same for all these wells. Thus, the management server can store the computed $T_r$ values at each well. Let $O_r$ denote the overall statistic for S. The result indicates that $$O_r = \left| \sum_{j \in R} T_{jr} \right|$$

$$cpd(S) = \underset{r}{\text{argmax}} |O_r|$$

An interesting aspect of such abstraction is that the stored statistic can be used for computation of other functions.

Figure 6A:
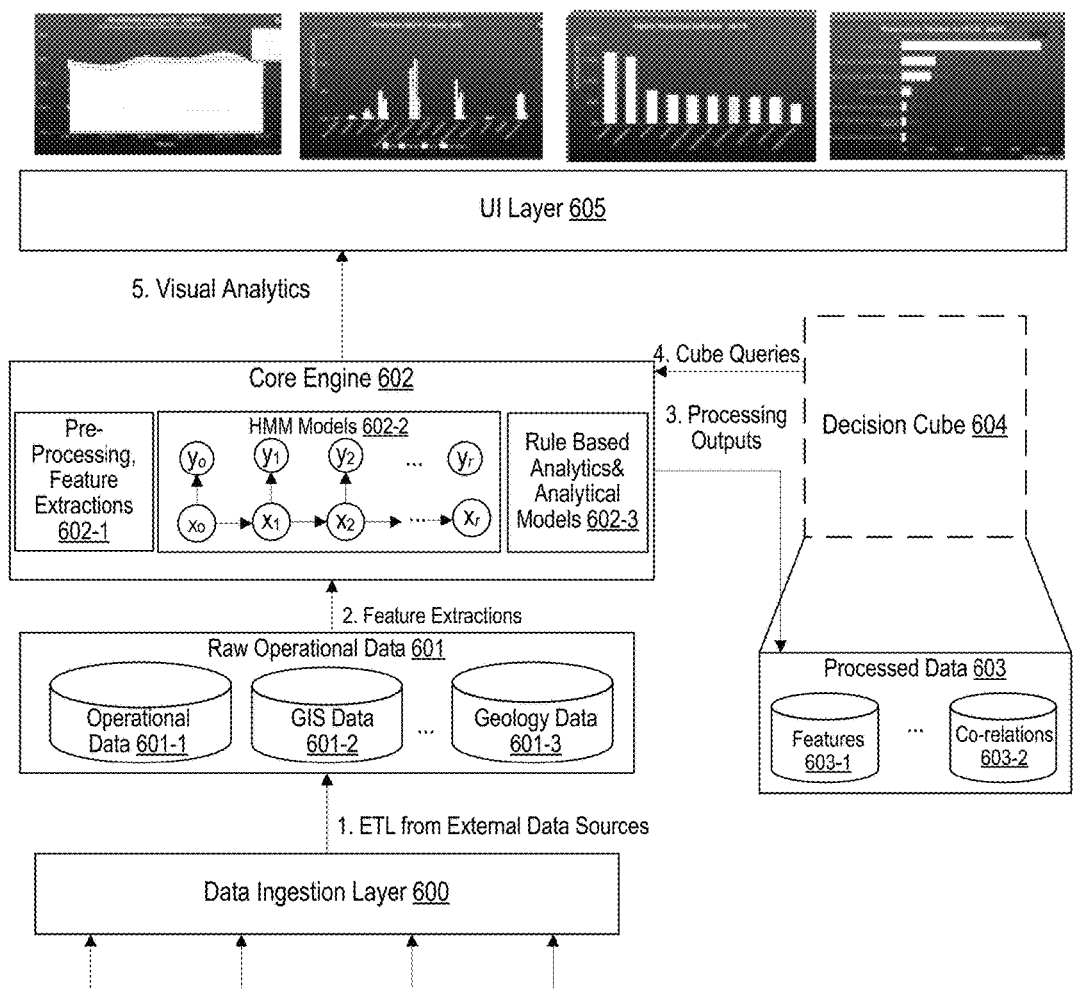
FIG. 6(a) illustrates an example system architecture for the management server, in accordance with an example implementation.

FIG. 6(a) illustrates an example system architecture for the management server, in accordance with an example implementation. The lower layer of the management server includes the data ingestion layer 600, which is configured to receive data from the network. The data can be external data sources and received directly from rig systems, or can be extracted from central repositories or databases. In an example implementation involving a central database, the data ingestion layer 600 may periodically query the central database, such as a public database that tracks oil and gas management information from rig systems, and obtain data from corresponding rig systems based on API. The data ingestion layer 600 may perform an extract, transform, and load (ETL) to process and forward the data to the raw operational data 601.

Data is ingested and processed as raw operational data in the raw operational data layer 601. The data that can be processed can include data such as operational data 601-1, Geographic Information Systems (GIS) data 601-2, Geology data 601-3, and so on. In the raw operational data layer 601, a feature extraction process is executed to process the data and extract features for feeding to the core engine layer 602.

The core engine layer 602 conduct pre-processing and feature extractions 602-1 to extract features from the raw operational data. Core engine layer 602 may also utilize hidden Markov models (HMM) 602-2 to determine relationships between attributes, including dependencies. Rule based analytics and analytical models 602-3 can be utilized to conduct analytics on the data for generating models. The outputs are processed and sent to the processed data layer 603, which can manage the features 603-1, co-relations between attributes 603-2 and other information for the decision cube 604. The decision cube layer 604 can also send cube queries to the core engine 602 to manage cube information as necessary.

Visual analytics can also be provided to the User Interface (UI) layer 605 for generating output. The UI interface layer 605 can be configured to take any two attributes from the cube and display them in a desired output format (e.g., bar graph, pie graph, line graph, etc.), with the x-axis and y-axis being based on the cube dimension of the attribute. The units of the x-axis and the y-axis can be scaled up and down according to the hierarchy of the attributes (i.e. along the scalar, spatial and temporal hierarchy).

Figure 6B:
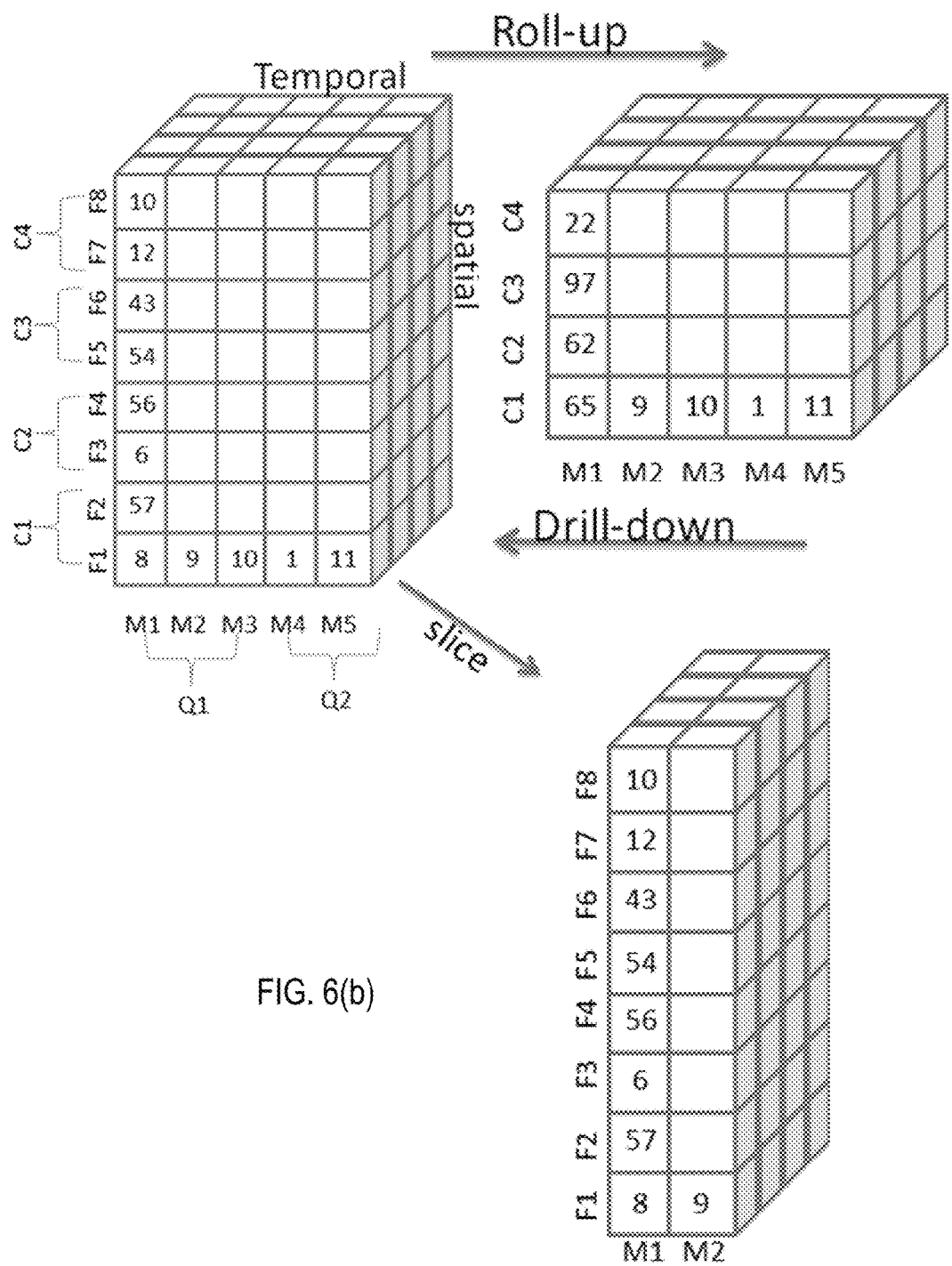
FIG. 6(b) illustrates an example cube implementation for the management server, in accordance with an example implementation.

FIG. 6(b) illustrates an example cube implementation for the management server, in accordance with an example implementation. In the example of FIG. 6(b), the decision cube 604 is constructed along the spatial, scalar, and temporal dimensions. In the example of FIG. 6(b), each cuboid contains values of statistic $O_r$ as described above. As illustrated, along the temporal axis M1, M2, M3, M4, M5, the dimension is denoted in months (M), wherein every three months can be denoted as quarters (Q) as illustrated at Q1 and Q2. Thus, if the cube is rolled up along the temporal hierarchy, the cube view can change from months to quarters as needed. Similarly, along the scalar dimension F1, F2, F3, F4, F5, F6, F7, and F8, the dimension is denoted in field (F), wherein C1, C2, C3, C4 represents the fields within a given county (C). In the example roll up operation as illustrated in FIG. 6(b), the cube is rolled up along the scalar hierarchy to the cube illustrated on the right, thereby rolling up the scalar hierarchy from field (F) to county (C) and providing a view of production values per county for given months. Similarly, in the example drill-down or roll down operation along the scalar hierarchy, the cube is rolled down from the cube on the right to the cube on the left, thereby rolling the scalar hierarchy from country (C) to field (F). In an example slice operation, the months M1 and M2 are selected, and the cube on the bottom illustrates the production values for the selected months M1 and M2 for all of the fields managed by the management server. Such materialized views can be reused for computation of other functions. The dimensions of the attributes can be stored in cube management information as illustrated in FIG. 9, wherein the data retrieved by the decision cube for generating key performance indicators can be in the form as illustrated in FIG. 16, with respect to production values, oilfield ID, county information, month and quarter information, and so forth. The data obtained can be utilized from the cubes can be utilized for generating key performance indicators as illustrated in the flow diagram of FIG. 15.

Figure 7:
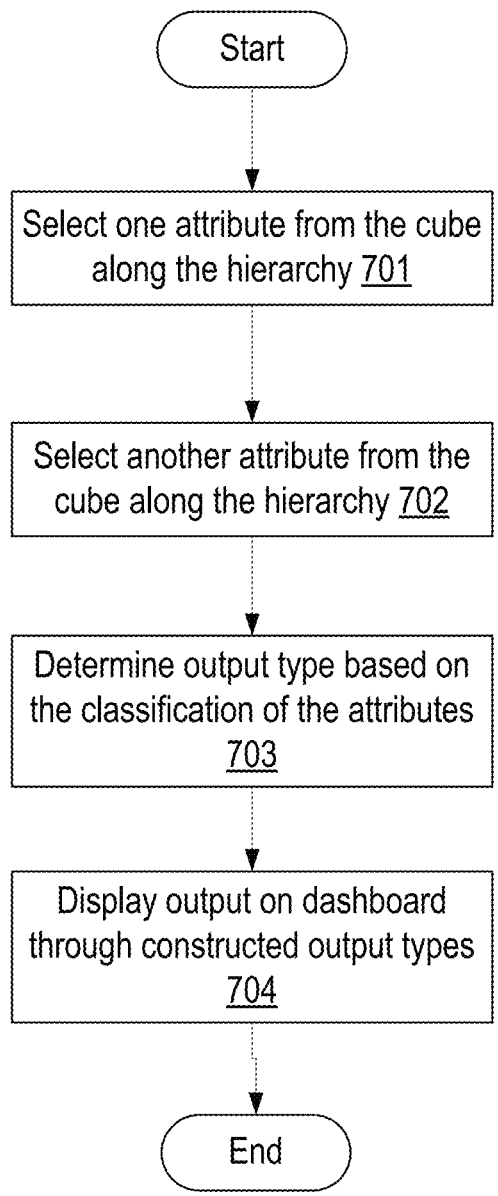
FIG. 7 illustrates an example flow diagram for generating output in the user interface layer, in accordance with an example implementation.

FIG. 7 illustrates an example flow diagram for generating output in the UI layer, in accordance with an example implementation. At 701, one attribute is selected from the cube through the UI layer for displaying output. In example implementations, a desired level within the scalar, spatial, or temporal hierarchy is selected. Other dimensions with corresponding hierarchies can also be utilized, depending on the desired implementation. At 702, another attribute is selected from the cube along with a desired level within the hierarchy of the attribute.

At 703, an output type is determined based on the classification of the attributes. For example, if one of the attributes is spatial in nature, then a map may be provided with indications of locations of the data based on the spatial hierarchy. An example can be output at the wellsite level, then rolled up to reservoir level, county level, and state level, or rolled down as desired. If one of the attributes is temporal in nature, a graph may be provided with time units in days. Then, the output can be rolled up to month level, year level and so on, or rolled down as desired.

At 704, the output is displayed on the dashboard through the constructed output types.

FIG. 8 illustrates example management information for classification of received attributes, in accordance with an example implementation. Such information can be managed by the management server in memory. The management information can be provided to the management server, or derived through any implementation of analytics depending on the desired implementation. Example of fields for the management information can include process information map (e.g., what groups of processes are to be applied to the attribute), attribute name, category along the cube dimensions, type (measured or derived data), and a description. In an example from FIG. 8, for a "Drilling Subsystem" process, there is an attribute "Torque" that is identified to be a temporal attribute that is measured (e.g., from a data source such as a sensor of FIG. 2). The example of the management information is not exhaustive and can include different or additional fields depending on the desired implementation.

FIG. 9 illustrates example management information of the cube, in accordance with an example implementation. Such information can be managed by the management server in memory. The information incorporated into the cube can include fields such as the attribute name, attribute dimension, and index along the cube. Although attributes have a primary attribute dimension, they can also be indexed along the other dimensions. This allows for attributes to roll up or roll down another attribute dimension, depending on the desired implementation. For example, although production of oil may be considered a scalar attribute, the output display can also be determined along the spatial dimension so that the output of production over a wellsite, a reservoir, a country, or a state can be displayed. In one example of FIG. 9, the "TORQUE" is a temporal attribute, and is assigned an index of 1 to the spatial attribute, one to the temporal attribute and one to the scalar attribute.

FIG. 10 illustrates the management of independent and dependent attributes across subsystems, in accordance with an example implementation. The independent and dependent variables can be determined from any form of analytics as known in the art, or initialized from manual entry from the management server operator or derived from one or more models. In one example from the circulation system, the pump strokes/minute attribute is an independent variable, and pump pressure is a dependent variable on the pump strokes/minute attribute. The independent and dependent attributes are not exhaustive, and can include other attributes depending on the analytics utilized or the attributes provided.

Figure 11:
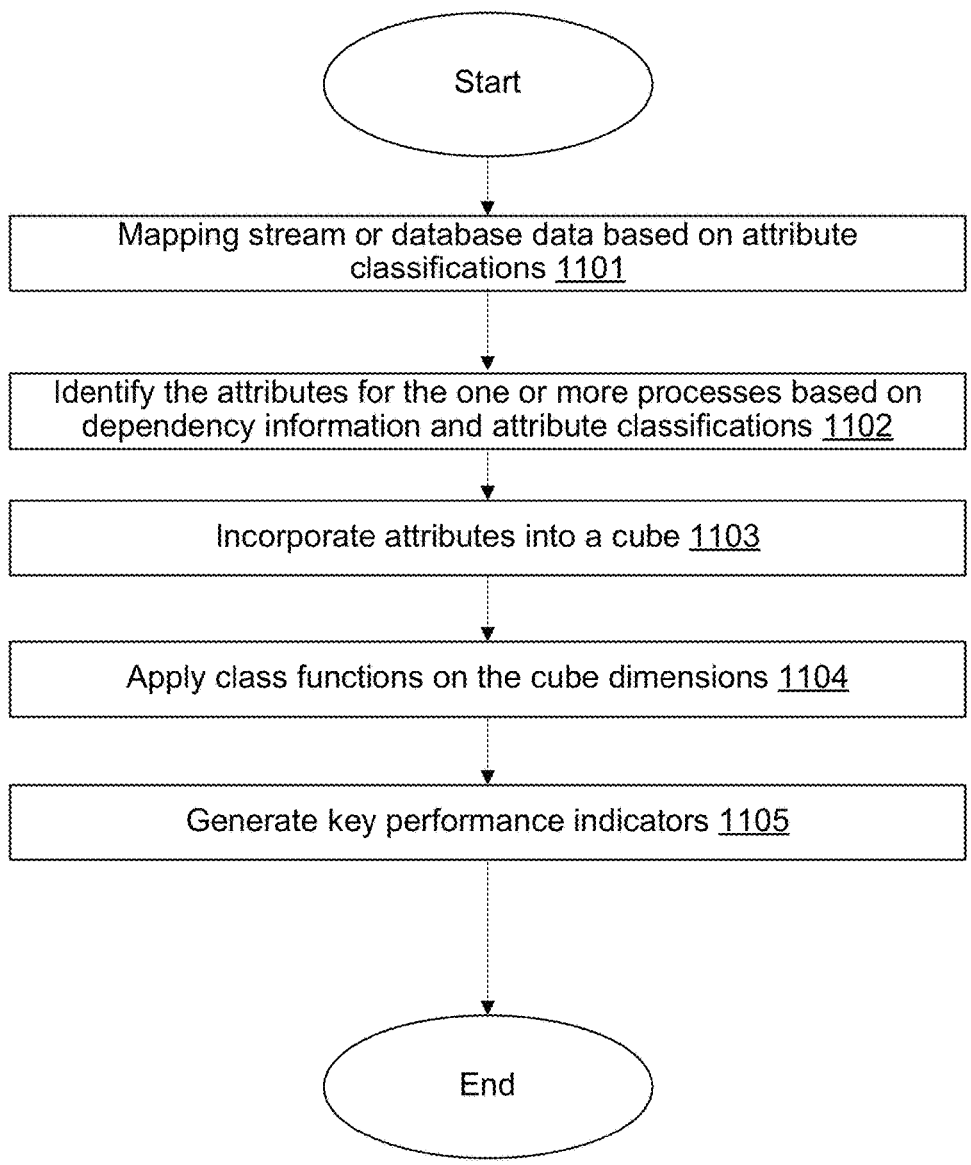
FIG. 11 illustrates a flow diagram for an example of the integration of management information of the management server in accordance with example implementations.

FIG. 11 illustrates a flow diagram for an example of the integration of management information of the management server in accordance with example implementations. In one example implementation, the management server maps at least one of stream and database data based on the classification of received attributes by utilizing the management information of FIG. 8 at 1101. The management server can map at least one of stream and database data to one or more processes related to oil and gas management based on the group of processes mapped to the particular attribute extracted from the data.

At 1102, the management server identifies one or more attributes for the one or processes related to the oil and gas management based on the management information of FIG. 8 and attribute dependency information as illustrated in FIG. 10. From the management information of FIG. 8, the management server can determine the dimension of the attribute, and also corresponding dependent attributes. The management server can process the stream or the database data from one or more wellsites, and/or from a central database.

At 1103, the management server incorporates the one or more attributes into a cube with dimensions having at least a scalar dimension, a spatial dimension, and a temporal dimension. The cube can have an index for the scalar dimension, the spatial dimension and the temporal dimension as illustrated in FIG. 9. The attributes are classified in the index based on the management information of FIG. 8.

At 1104 the management server applies class functions on at least the scalar dimension, the spatial dimension, and the temporal dimension of the cube. Each of the dimensions have corresponding class functions, such as scalar functions, spatial functions and temporal functions as described above. The application of class functions is based on the assignment of the attribute as determined from management information of FIG. 8, wherein each of the attributes is assigned a category of one of scalar, spatial, and temporal. In example implementations, the management server applies the scalar functions to the one or more attributes in the scalar category; applies the spatial functions to the one or more attributes in the spatial category; and applies the temporal functions to the one or more attributes in the temporal category. The application of the one or more class functions can also be based on the corresponding hierarchy representation that is selected for output.

At 1105 the management server produces output through generating key performance indicators related to the oil and gas management from the applying of the one or more class functions on the scalar dimension, the spatial dimension, and the temporal dimension of the cube. The generating of the key performance indicators includes the selection of attributes for display, and displaying output across at least one of at least the scalar dimension, the spatial dimension, and the temporal dimension of the cube from the applying the one or more class functions on a level selected from the corresponding hierarchy representation.

Figure 12A:
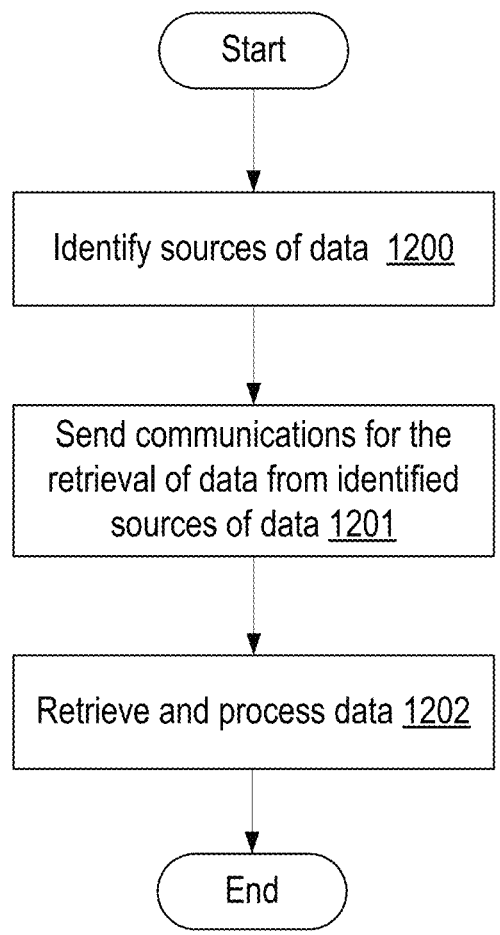
FIGS. 12(a) and 12(b) illustrate flow diagrams for oil and gas management based on example implementations.
Figure 12B:
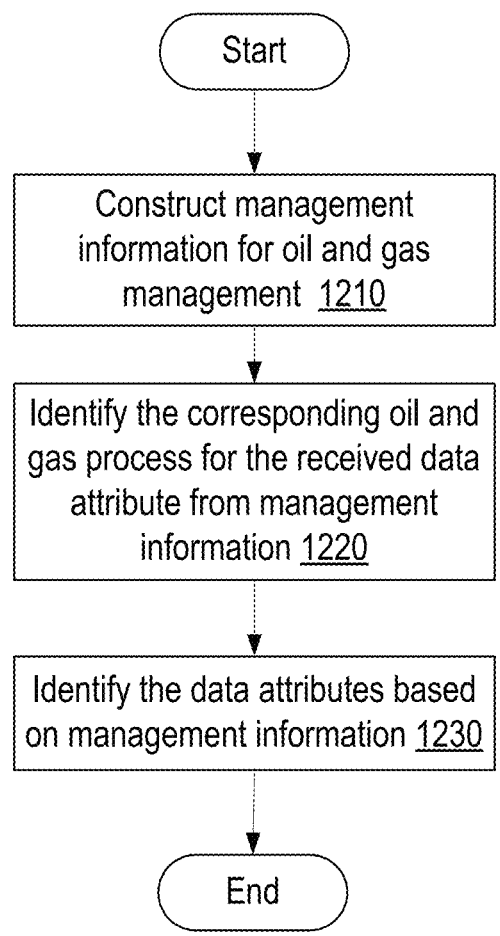

FIG. 12(*a*) illustrates an example flowchart for conducting oil and gas management based on example implementations. In the example of FIG. 12(*a*), the management server 102 of FIG. 1(*a*) conducts initial processing to initiate the ingestion of data from data sources. At 1200, the management server 102 identifies the sources of data to be streamed or harvested. In the example from FIG. 1(*a*), rig systems 101-1, 101-2, 101-3, 101-4, and 101-5 are managed by the management server 102 and are identified as the sources of data. At 1201, management server 102 sends communications for the retrieval of data from identified sources of data 1201. In the example of FIG. 1(*a*), management server 102 can communicate with rig systems 101-1, 101-2, 101-3, 101-4, and 101-5 for the sending of data, and the rig systems 101-1, 101-2, 101-3, 101-4, and 101-5 transmit data to the management server 102. In another example implementation, rig systems 101-1, 101-2, 101-3, 101-4, and 101-5 transmit to a central database, whereupon the management server 102 harvests the data from the central database. At 1203, the management server 102 receives the data and processes the data in accordance with FIG. 5 and FIG. 11.

FIG. 12(*b*) illustrates an example flowchart for conducting oil and gas management based on example implementations. In the example of FIG. 12(*b*), the management server 102 of FIG. 1(*a*) conducts processing for identifying processes related to oil and gas management and then identifying the corresponding process for received data attributes. At 1210, the management information as illustrated in FIGS. 8-10 is constructed. The construction of such management information can be performed by receiving the management information from rig system operators, or can be constructed by utilizing analytics of the rig systems managed by the management server 102. For example, the example implementations of oil and gas management analytics of PCT Application No. PCT/US2014/32394 can be utilized for the construction of the management information of FIGS. 8-10. At 1220, the management server 102 identifies the corresponding oil and gas process from the management information for received streamed/historical data, and processes the data for attributes based on the corresponding oil and gas process. For example, management server 102 can process data based on the management information of FIG. 10 to identify the oil and gas subsystem corresponding to the received data, and can derive the process from the process information map of FIG. 8. At 1230, the management server 102 identifies the data attributes based on the management information. Based on the management information of FIG. 8, the management server identifies the attribute name associated with the data and the identified oil and gas process, and indexes the identified attribute in the cube management information of FIG. 12(*b*).

Figure 13:
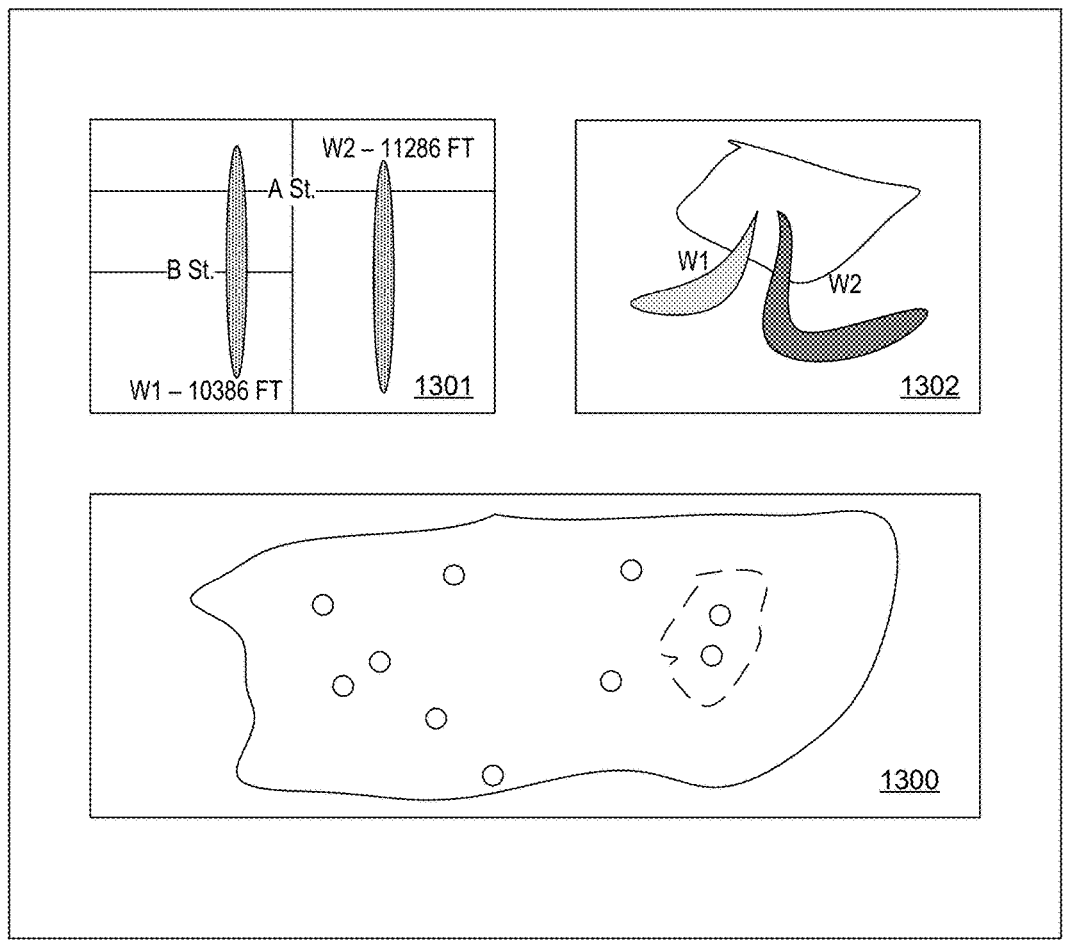
FIG. 13 illustrates an example output of key performance indicators in accordance with an example implementation.

FIG. 13 illustrates an example output of key performance indicators in accordance with an example implementation. In the example of FIG. 13, the key performance indicators are provided in a three pane dashboard constructed in accordance with FIG. 7, based on the selection of well placement and well trajectory attributes from FIG. 8. The pane of 1300 illustrates wells of a reservoir rolled up in the spatial hierarchy to the reservoir field level. In the example dashboard of 1300, two wells are selected with a freeform dashed line to roll the spatial hierarchy down to the well and street level, which is illustrated in the pane of 1301, which illustrates two wells in 2D based on latitude and longitude that were selected in pane 1300 with the freeform dashed line, with well W1 and well W2 and their depth. Rolling the spatial hierarchy down to the depth level can produce results as illustrated in the example of pane at 1302, which illustrates the two wells W1 and W2 and their respective underground well trajectories in 3D.

Figure 14:
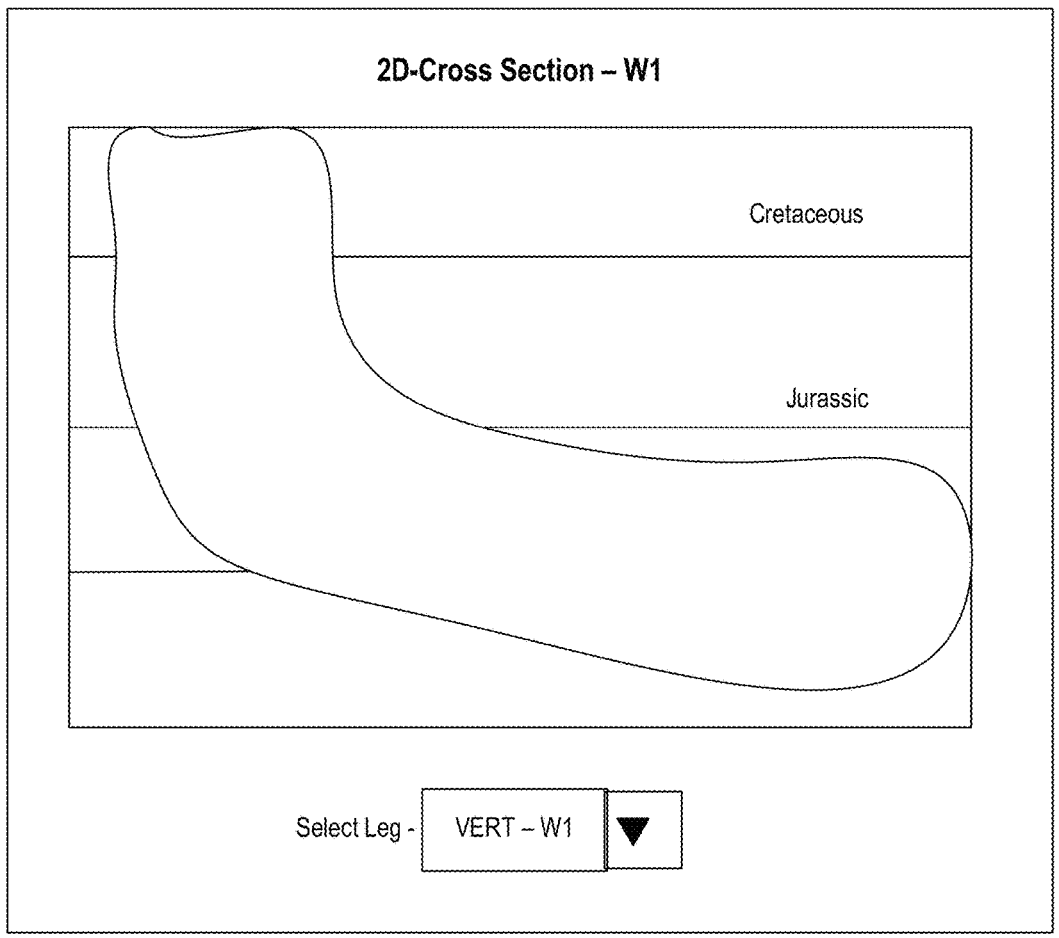
FIG. 14 illustrates an example output of key performance indicators in accordance with an example implementation.

FIG. 14 illustrates an example output of key performance indicators in accordance with an example implementation. In the example of FIG. 14, well W1 is selected at the 2D KPI output of pane 1300 and the spatial attributes are configured to display the two dimensional cross selection of the well. The underground cross section is selected based on the underground well leg based on the data accumulated from the associated well. In the example of FIG. 14, the 2D cross section is also provided with respect to the geographic layers traversed by the well trajectory.

Figure 15:
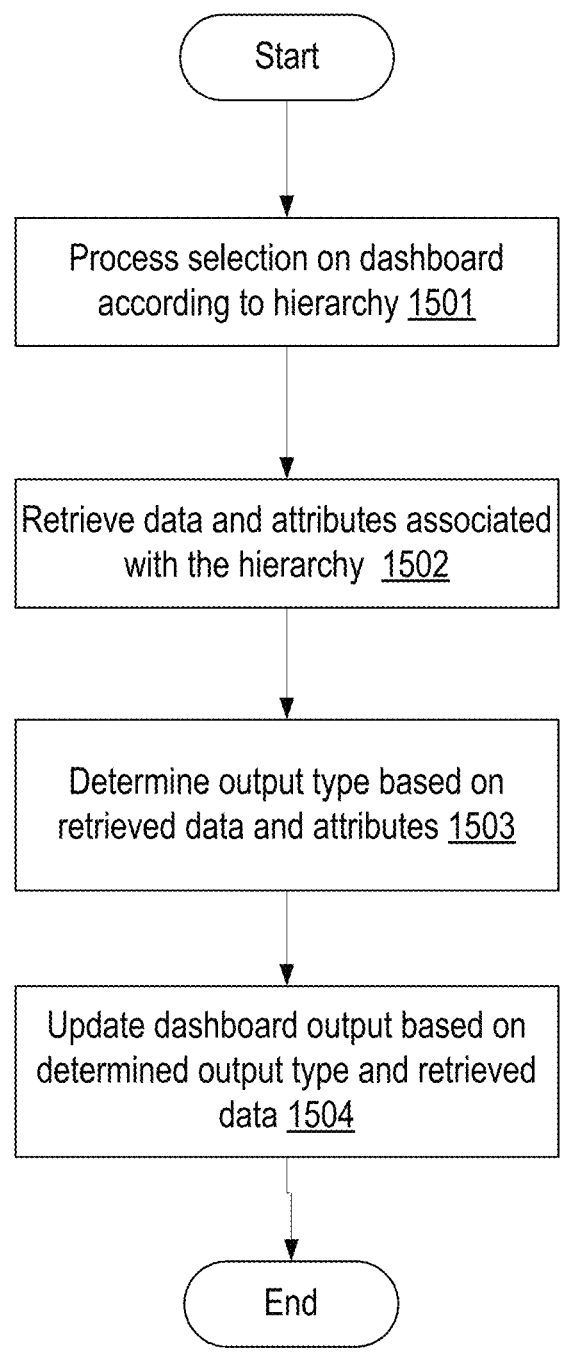
FIG. 15 illustrates an example flow diagram for the generation of key performance indicators based on the desired hierarchy, in accordance with an example implementation.

FIG. 15 illustrates an example flow diagram for the generation of key performance indicators based on the desired hierarchy, in accordance with an example implementation. FIG. 16 illustrates example data information retrieved by the decision cube for generating key performance indicators, in accordance with an example implementation. UI layer 605 of FIG. 6(*a*) can provide a dashboard interface constructed based on the selected attributes from the flow of FIG. 7, wherein key performance indicators can be generated. Through the dashboard provided by UI layer 605 of FIG. 6(*a*), the hierarchy of the displayed key performance indicators can be modified as desired. At 1501, a selection is processed on the dashboard according to a desired hierarchy. At 1502, based on the selection on the dashboard and the desired hierarchy, the management server 102 retrieves data and attributes associated with the desired hierarchy. As illustrated in FIG. 6(*b*), in an example for obtaining production values for a field, the data is obtained from the left most cube, and for a roll up along the scalar dimension to the county level, the cube from the right is obtained. At 1503, the output type is determined based on the retrieved data and attributes. At 1504, the dashboard output is updated based on the determined output type and retrieved data.

Turning to the example of FIG. 13, at 1501 a selection is made on pane 1300 to select two wells in the well reservoir with the freeform dashed line, wherein the attributes selected for the generation of the dashboard are well location and well index of wells managed by the management server 102. The management server 102 interprets the input as a desire to roll the spatial hierarchy down to the well and street level for the well location, and at 1502, retrieves the well index of the selected wells and harvests well trajectory information for the selected wells as illustrated in FIG. 16, by using operations similar to the ones illustrated in FIG. 6(*b*). Based on the attributes used to generated the dashboard (well trajectory and well index), at 1503, the management server 102 obtains the well ID for the well index, and obtains the associated well trajectory information based on the attribute used to generate the dashboard. In the example of FIG. 16, the well trajectory attribute includes 3D trajectory data, depth, and latitude/longitude information. At 1504, output panes 1301 and 1302 are updated based on the retrieved data. In the output pane of 1301, a 2D plot is provided based on well index information and latitude/longitude information as retrieved by the management server 102. In the example, management server 102 selects a map output as the well trajectory information is a spatial attribute as identified in FIG. 8. Further, output pane of 1302 is also generated to plot the 3D trajectory data obtained from the retrieved data by the management server 102, and a 3D map output is selected by management server 102 as the 3D trajectory data is a spatial attribute.

Turning to the example of FIG. 14, a selection is made on output pane 1301 on well W1. In accordance with FIG. 15, the selection is interpreted as a desire to roll the spatial hierarchy down to the individual well W1 at 1501. At 1502, the management server 102 retrieves the well index of the selected wells and harvests well trajectory information for the selected wells, which would be data for well ID W1 only from FIG. 16, by using operations similar to the ones illustrated in FIG. 6(*b*). At 1503, the management server 102 identifies that only one well is utilized for output and changes the dashboard to a one pane for displaying a cross section of well W1 based on well trajectory information. At 1504, the dashboard output is updated based on the determination to change the dashboard to a single pane display of a cross section of well W1. The selection by the management server 102 in this example can be changed based on the desired implementation and the construction of the dashboard. For example, the selection can be a 3D trajectory of well W1, or can be another roll down output depending on the desired implementation.

Finally, some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
identifying one or more processes related to oil and gas management from managed rig systems;
mapping at least one of stream and database data to the one or more processes related to oil and gas management;
identifying one or more attributes for the one or processes related to the oil and gas management;
incorporating the one or more attributes into a decision cube comprising at least a scalar dimension, a spatial dimension, and a temporal dimension;
applying one or more class functions on the at least the scalar dimension, the spatial dimension, and the temporal dimension of the decision cube;
generating key performance indicators related to the oil and gas management from the applying of the one or more class functions on the at least the scalar dimension, the spatial dimension, and the temporal dimension of the decision cube, the generating key performance indicators comprising generating an instance of the decision cube Configured to facilitate at least one of roll-up, roll-down, or online analytical processing (OLAP) operations on the one or more attributes incorporated into the decision cube.

2. The method of claim 1, wherein each of the at least the scalar dimension, the spatial dimension, and the temporal dimension comprises a corresponding hierarchy representation; wherein the applying of the one or more class functions on the at least the scalar dimension, the spatial dimension, and the temporal dimension is conducted based on the corresponding hierarchy representation.

3. The method of claim 2, wherein generating the key performance indicators comprises displaying output across at least one of at least the scalar dimension, the spatial dimension, and the temporal dimension of the cube from the applying the one or more class functions on a level selected from the corresponding hierarchy representation.

4. The method of claim 1, wherein the at least one of the stream and the database data is obtained from one or more wellsites.

5. The method of claim 1, wherein the one or more class functions comprise scalar functions, spatial functions and temporal functions, wherein each of the one or more attributes is assigned a category of one of a scalar category, a spatial category, and a temporal category; and wherein the applying the one or more class functions comprises:
applying the scalar functions to the one or more attributes in the scalar category;
applying the spatial functions to the one or more attributes in the spatial category; and
applying the temporal functions to the one or more attributes in the temporal category.

6. A non-transitory computer readable medium, storing instructions for executing a process, the instructions when executed by a processor causes the processor to perform the steps comprising:
identifying one or more processes related to oil and gas management from managed rig systems;
mapping at least one of stream and database data to one or more processes related to oil and gas management;
identifying one or more attributes for the one or processes related to the oil and gas management;
incorporating the one or more attributes into a decision cube comprising at least a scalar dimension, a spatial dimension, and a temporal dimension;
applying one or more class functions on the at least the scalar dimension, the spatial dimension, and the temporal dimension of the decision cube; and
generating key performance indicators related to the oil and gas management from the applying of the one or more class functions on the at least the scalar dimension, the spatial dimension, and the temporal dimension of the decision cube, the generating key performance indicators comprising generating an instance of the decision cube configured to facilitate at least one of roll-up, roll-down, or online analytical processing (OLAP) operations on the one or more attributes incorporated into the decision cube.

7. The non-transitory computer readable medium of claim 6, wherein each of the at least the scalar dimension, the spatial dimension, and the temporal dimension comprises a corresponding hierarchy representation; wherein the applying of the one or more class functions on the at least the scalar dimension, the spatial dimension, and the temporal dimension is conducted based on the corresponding hierarchy representation.

8. The non-transitory computer readable medium of claim 7, wherein generating the key performance indicators comprises displaying output across at least one of at least the scalar dimension, the spatial dimension, and the temporal dimension of the cube from the applying the one or more class functions on a level selected from the corresponding hierarchy representation.

9. The non-transitory computer readable medium of claim 6, wherein the stream or the database data is obtained from one or more wellsites.

10. The non-transitory computer readable medium of claim 6, wherein the one or more class functions comprise scalar functions, spatial functions and temporal functions, wherein each of the one or more attributes is assigned a category of one of a scalar category, a spatial category, and a temporal category; and wherein the applying the one or more class functions comprises:
applying the scalar functions to the one or more attributes in the scalar category;
applying the spatial functions to the one or more attributes in the spatial category; and
applying the temporal functions to the one or more attributes in the temporal category.

11. A management server, comprising:
a memory configured to manage cube management information to facilitate a cube and one or more processes related to oil and gas management from rig systems managed by the management server; and
a processor, configured to:
map at least one of stream and database data to the one or more processes related to oil and gas management;

identify one or more attributes for the one or processes related to the oil and gas management;
incorporate the one or more attributes into the decision cube comprising dimensions of at least a scalar dimension, a spatial dimension, and a temporal dimension;
apply one or more class functions on the at least the scalar dimension, the spatial dimension, and the temporal dimension of the decision cube; and
generate key performance indicators related to the oil and gas management from the application of the one or more class functions on the at least the scalar dimension, the spatial dimension, and the temporal dimension of the cube through a generation of an instance of the decision cube configured to facilitate at least one of roll-up, roll-down, or online analytical processing (OLAP) operations on the one or more attributes incorporated into the decision cube.

12. The management server of claim 11, wherein each of the at least the scalar dimension, the spatial dimension, and the temporal dimension comprises a corresponding hierarchy representation; wherein the processor is configured to apply the one or more class functions on the at least the scalar dimension, the spatial dimension, and the temporal dimension is conducted based on the corresponding hierarchy representation.

13. The management server of claim 12, wherein the processor is configured to generate the key performance indicators from displaying output across at least one of at least the scalar dimension, the spatial dimension, and the temporal dimension of the cube from the applying the one or more class functions on a level selected from the corresponding hierarchy representation.

14. The management server of claim 11, wherein the processor is configured to obtain the stream or the database data from one or more wellsites.

15. The management server of claim 11, wherein the one or more class functions comprise scalar functions, spatial functions and temporal functions, wherein each of the one or more attributes is assigned a category of one of a scalar category, a spatial category, and a temporal category; and wherein the processor is configured to apply the one or more class functions by:
applying the scalar functions to the one or more attributes in the scalar category;
applying the spatial functions to the one or more attributes in the spatial category; and
applying the temporal functions to the one or more attributes in the temporal category.

* * * * *